United States Patent
Grund et al.

[11] Patent Number: 5,892,046
[45] Date of Patent: Apr. 6, 1999

[54] METHINE AND AZAMETHINE DYES BASED ON TRIFLUOROMETHYLPYRIDONES

[75] Inventors: Clemens Grund, Mannheim; Helmut Reichelt, Neustadt; Andreas Johann Schmidt, Freinsheim; Stefan Beckmann, Bad Dürkheim, all of Germany

[73] Assignee: BASF Aktiengesellschaft, Ludwigshafen, Germany

[21] Appl. No.: 842,267

[22] Filed: Apr. 24, 1997

[30] Foreign Application Priority Data

May 8, 1996 [DE] Germany .................. 196 18 528.9

[51] Int. Cl.$^6$ .................. C07D 211/68; C07D 401/00; C07D 215/38; C07D 413/00
[52] U.S. Cl. .................. 546/194; 546/198; 546/197; 546/208; 546/209; 546/159; 546/167; 544/120; 544/130
[58] Field of Search .................. 546/194, 198, 546/197, 208, 209, 159, 167; 544/120, 130

[56] References Cited

U.S. PATENT DOCUMENTS 5,623,075 4/1997 Beckmann et al. .................. 546/269.7

FOREIGN PATENT DOCUMENTS

| 0 691 382 | 1/1996 | European Pat. Off. . |
| 44 40 066 | 5/1996 | Germany . |
| 64-68743 | 3/1989 | Japan . |
| 8-122972 | 5/1996 | Japan . |
| 8-171173 | 7/1996 | Japan . |
| WO 96/15195 | 5/1996 | WIPO . |

Primary Examiner—Mukund J. Shah
Assistant Examiner—Tamthom T. Ngo
Attorney, Agent, or Firm—Oblon, Spivak, McClelland, Maier & Neustadt, P.C.

[57] ABSTRACT

The present invention relates to trifluoromethylpyridone-based methine and azamethine dyes of the formula I

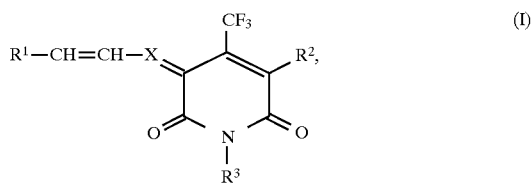

a process for their thermal transfer, a process for dyeing or printing synthetic materials and their use.

11 Claims, No Drawings

METHINE AND AZAMETHINE DYES BASED ON TRIFLUOROMETHYLPYRIDONES

The present invention relates to novel methine and azamethine dyes based on trifluoromethylpyridones, to a process for their thermal transfer, to a process for dyeing or printing synthetic materials, and to their use.

Methine(polymethine) dyes as described for example in Römpp Chemie Lexikon, 9th Edition, 1995, Vol. 5, p. 3555 are widely used and have immense technical significance, for example as photographic sensitizers and as laser and textile dyes. In general, they are substituted or unsubstituted polyenes with two terminal auxochromic groups, one a donor, the other an acceptor group, which act as push-pull system.

JP-A-339 237 describes the preparation of 1-alkyl-2-cyano-4-trifluoromethyl-6-hydroxypyrid-2-ones. Furthermore, JP-A-331 382 and Bull. Chem. Soc. Japan, 66 (1993), 1790–1794, disclose azo dyes having the abovementioned compound as coupling component.

However, these azo dyes are still in need of improvement as regards their application properties and specifically their use for the transfer of dyes from a transfer by diffusion or sublimation and their use for dyeing and printing synthetic materials.

It is an object of the present invention to provide novel trifluoromethylpyridone-based dyes having improved application properties.

We have found that this object is achieved, surprisingly, by methine and azamethine dyes based on trifluoromethylpyridones.

The present invention accordingly provides methine or azamethine dyes of the formula I

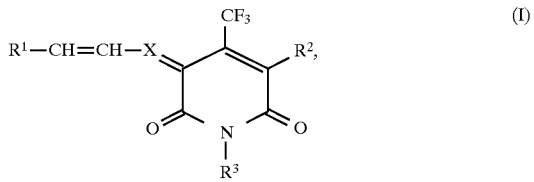

where
X is nitrogen or CH,
$R^1$ is a substituted or unsubstituted 5- or 6-membered carbocyclic or heterocyclic radical with or without a fused-on substituted or unsubstituted aryl and having orbitals capable of conjugation,
$R^2$ is cyano, carbamoyl, carboxyl, alkoxycarbonyl or alkanoyl, and
$R^3$ is alkyl, unsubstituted or substituted by one, two or three of the following groups: alkanoyloxy, alkylaminocarbonyloxy, alkoxycarbonyl, alkoxycarbonyloxy, the alkyl group in the three last-mentioned radicals being uninterrupted or interrupted by 1, 2 or 3 oxygen atoms and unsubstituted or phenyl- or phenoxy-substituted, cycloalkyl, unsubstituted or bearing 1, 2, 3, 4 or 5 alkyl groups, aryl, unsubstituted or bearing one, two or three substituents selected from the group consisting of alkyl, alkoxy, halogen, nitro and carboxyl, cycloalkyloxy, phenoxy, halogen, alkoxy, hydroxyl or cyano and/or uninterrupted or interrupted by 1, 2 or 3 oxygen atoms,
cycloalkyl, unsubstituted or substituted by 1, 2, 3, 4 or 5 alkyl substituents,
aryl, unsubstituted or bearing one, two or three substituents selected from the group consisting of alkyl, alkoxy, halogen, nitro and carboxyl,
or a radical of the formula $NE^1E^2$, where $E^1$ and $E^2$ are identical or different and each have the meanings specified for $R^3$ other than $NE^1E^2$ or are pyridyl, unsubstituted or bearing one, two or three substituents selected from the group consisting of alkyl, alkoxy, halogen, nitro and carboxyl, alkanoyl, alkoxycarbonyl, alkylsulfonyl, cycloalkylsulfonyl, phenylsulfonyl, substituted or unsubstituted, pyridylsulfonyl, substituted or unsubstituted, benzoyl, substituted or unsubstituted, pyridylcarbonyl or thienylcarbonyl, or
$E^1$ and $E^2$ plus the nitrogen to which they are attached are succinimido, unsubstituted or bearing one or two alkyl substituents, phthalimido, unsubstituted or bearing one or two $C_1$–$C_4$-alkyl substituents, or a 5- or 6-membered saturated heterocyclic radical with or without one or more alkyl substituents and/or 1 or 2 further hetero atoms selected from the group consisting of oxygen, nitrogen and sulfur, and the salts thereof.

Where there are two or more substituents in the radical, they can be identical or different.

Halogen for the purposes of the present invention is fluorine, chlorine, bromine or iodine, especially chlorine or bromine.

Alkyl encompasses straight-chain and branched alkyl groups. Alkyl is preferably straight-chain or branched $C_1$–$C_{13}$-alkyl, especially $C_1$–$C_8$-alkyl, preferably $C_1$–$C_6$-alkyl, particularly preferably $C_1$–$C_4$-alkyl. Examples of alkyl are in particular methyl, ethyl, propyl, 1-methylethyl, butyl, 1-methylpropyl, 2-methylpropyl, 1,1-dimethylethyl, n-pentyl, 1-methylbutyl, 2-methylbutyl, 3-methylbutyl, 1,2-dimethylpropyl, 1,1-dimethylpropyl, 2,2-dimethylpropyl, 1-ethylpropyl, n-hexyl, 1-methylpentyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 1-methylhexyl, 1-ethylpentyl, 2-ethylpentyl, 1-propylbutyl, octyl, decyl, dodecyl.

Substituted alkyl preferably has 1, 2 or 3 substituents, especially 1 or 2 substituents in any desired position.

In oxygen-interrupted alkyl, the number of oxygen atoms is preferably 1 or 2.

The above remarks concerning alkyl apply correspondingly to the alkyl group in alkoxy, alkylsulfonylamino, alkylaminosulfonylamino, alkanoyl, alkoxycarbonyl, alkylsulfonyl, etc.

Alkenyl encompasses straight-chain or branched alkenyl groups. Alkenyl is preferably straight-chain or branched $C_2$–$C_{12}$-alkenyl, particularly $C_2$–$C_6$-alkenyl, particularly preferably $C_3$–$C_4$-alkenyl. Examples of alkenyl groups are 2-propenyl, 2-butenyl, 3-butenyl, 1-methyl-2-propenyl, 2-methyl-2-propenyl, 2-pentenyl, 3-pentenyl, 4-pentenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-2-propenyl, 1-ethyl-2-propenyl, 2-hexenyl, 3-hexenyl, 4-hexenyl, 5-hexenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,2-dimethyl-2-butenyl, 1,1-dimethyl-3-butenyl, 1,1-dimethyl-3-butenyl, 1,2-dimethyl-2-butenyl, 1,2-dimethyl-3-butenyl, 1,3-dimethyl-2-butenyl, 1,3-dimethyl-3-butenyl, 2,2-dimethyl-3-butenyl, 2,3-dimethyl-2-butenyl, 2,3-dimethyl-3-butenyl, 1-ethyl-2-butenyl, 1-ethyl-3- butenyl, 2-ethyl-2-butenyl, 2-ethyl-3-butenyl, 1,1,2-trimethyl-2-propenyl, 1-ethyl-1-methyl-2-propenyl and 1-ethyl-2-methyl-2-propenyl, especially 2-propenyl, 1-methyl-2-propenyl and 2-methyl-2-propenyl.

Cycloalkyl is preferably $C_5$–$C_7$-cycloalkyl, such as cyclopentyl, cyclohexyl or cycloheptyl.

Substituted cycloalkyl preferably has 1, 2, 3, 4 or 5, especially 1, 2 or 3, alkyl radicals as substituents.

Aryl is preferably phenyl or naphthyl, especially phenyl.

Substituted aryl or pyridyl radicals have as substituents for example $C_1$–$C_8$-alkyl, $C_1$–$C_8$-alkoxy, halogen, nitro or carboxyl. Generally the number of substituents is preferably 1, 2 or 3.

Phenylalkyl is preferably phenyl-$C_1$–$C_4$-alkyl, especially benzyl.

$R^1$ is a 5- or 6-membered carbo- or heterocycle with or without substitution and/or with or without fusion to a substituted or unsubstituted aryl and having orbitals capable of conjugation.

$R^1$ is preferably a substituted or unsubstituted benzene, indole, quinoline, naphthalene, pyrrole, thiazole, benzimidazole, benzothiazole, thiophene or pyridine derivative.

$R^1$ is particularly preferably a radical of the formula IIa to IIj

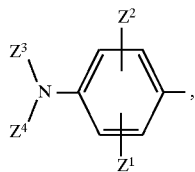
(IIa)

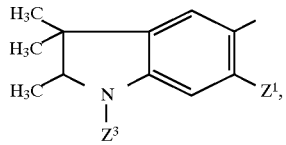
(IIb)

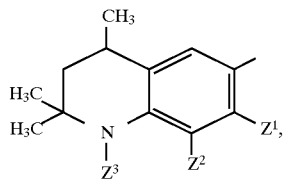
(IIc)

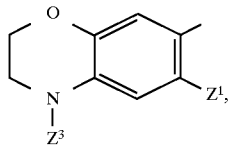
(IId)

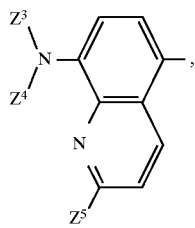
(IIe)

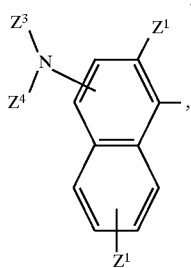
(IIf)

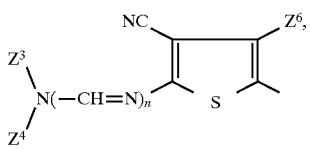
(IIg)

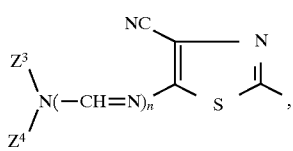
(IIh)

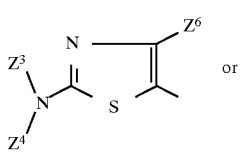
(IIi)

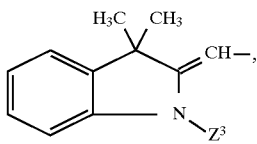
(IIj)

where n is 0 or 1, $Z^1$ and $Z^2$ are identical or different and $Z^1$ is hydrogen, alkyl, uninterrupted or interrupted by 1, 2 or 3 oxygen atoms, hydroxyl, alkoxy, alkylsulfonylamino, mono- or dialkylaminosulfonylamino or —NHCOZ$^7$ or —NHC$_2$Z$^7$, where $Z^7$ is phenyl, benzyl, tolyl or alkyl with or without interruption by 1, 2 or 3 oxygen atoms, and $Z^2$ is hydrogen, alkyl or alkoxy;

$Z^3$ and $Z^4$ are identical or different and each have the meanings specified above for $E^1$ and $E^2$ or are alkenyl, or $Z^3$ and $Z_4$ plus the nitrogen atom to which they are attached are a 5- or 6-membered saturated heterocyclic radical with or without two further hetero atoms selected from the group consisting of oxygen, nitrogen and sulfur (e.g. the heterocyclic derivatives mentioned above for $R^1$)

$Z^5$ is hydrogen or alkyl; and $Z^6$ is hydrogen, halogen, alkyl, phenyl, phenylalkyl, cycloalkyl, thienyl, hydroxyl, alkoxy, alkylthio or monoalkylamino, the two aryl radicals being unsubstituted or bearing one, two or three substituents selected from the group consisting of alkyl, alkoxy, halogen, nitro and carboxyl.

Examples of preferred $R^3$, $E^1$, $E^2$, $Z^1$, $Z^2$, $Z^3$, $Z^4$, $Z^5$, $Z^6$ and $Z^7$ are methyl, ethyl, propyl, isopropyl, butyl, isobutyl, sec-butyl or tert-butyl.

Preferred $R^3$, $E^1$, $E^2$, $Z^1$, $Z^3$, $Z^4$, $Z^6$ and $Z^7$ further include $C_5$–$C_{13}$-alkyl, e.g. pentyl, isopentyl, neopentyl, tert-pentyl, hexyl, 2-methylpentyl, heptyl, octyl, 2-ethylhexyl, isooctyl, nonyl, isononyl, decyl, isodecyl, undecyl, dodecyl, tridecyl or isotridecyl. [The designations isooctyl, isononyl, isodecyl and isotridecyl are trivial names derived from the oxo process alcohols (cf. Ullmann's Encyclopedia of Industrial Chemistry, 5th Edition, Vol. A1, pages 290 to 293, and also Vol. A 10, pages 284 and 285).]

Preferred $R^3$, $E^1$, $E^2$, $Z^1$, $Z^3$, $Z^4$ and $Z^7$ further include alkyl, interrupted by 1, 2 or 3 oxygen atoms, e.g. 2-methoxyethyl, 2-ethoxyethyl, 2-propoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,9-trioxadecyl or 3,6,9-trioxaundecyl.

Preferred $Z^1$, $Z^2$ and $Z^6$ further include $C_1$–$C_4$-alkoxy, e.g. methoxy, ethoxy, ethoxy, propoxy, isopropoxy, butoxy, isobutoxy or sec-butoxy.

Preferred $R^3$, $E^1$, $E^2$ and $Z^6$ further include for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl, 2,4-dimethoxyphenyl, 2-, 3- or 4-chlorophenyl, 2,6-dichlorophenyl, 2-, 3- or 4-nitrophenyl or 2-, 3- or 4-carboxyphenyl.

Preferred $Z^3$, $Z^4$, $Z^6$, $E^1$ and $E^2$ further include for example cyclopentyl, cyclohexyl or cycloheptyl.

Preferred $R^3$, $Z^3$, $Z^4$, $E^1$ and $E^2$ further include for example benzyl, 2-methylbenzyl, 1- or 2-phenylethyl, 2-hydroxyethyl, 2- or 3-hydroxypropyl, 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2- or 3-ethoxycarbonylpropyl, 2-methoxycarbonyloxyethyl, 2- or 3-methoxycarbonyloxypropyl, 2-ethoxycarbonyloxyethyl, 2- or 3-ethoxycarbonyloxypropyl, 2-butoxy carbonyloxyethyl, 2- or 3-butoxycarbonyloxypropyl, 2-(2-phenyl ethoxycarbonyloxy)ethyl, 2- or 3-(2-phenyl ethoxycarbonyloxy)propyl, 2-(2-ethoxyethoxycarbonyloxy) ethyl or 2- or 3-(2-ethoxyethoxycarbonyloxy)propyl.

Preferred $E^1$ and $E^2$ further include for example pyridyl, 2-, 3- or 4-methylpyridyl, 2-, 3- or 4-methoxypyridyl, formyl, acetyl, propionyl, butyryl, isobutyryl, pentanoyl, hexanoyl, heptanoyl, octanoyl, 2-ethylhexanoyl, methoxycarbonyl, ethoxycarbonyl, propoxycarbonyl, isopropoxycarbonyl, butoxycarbonyl, isobutoxycarbonyl, sec-butoxycarbonyl, methylsulfonyl, ethylsulfonyl, propylsulfonyl, isopropylsulfonyl, butylsulfonyl, cyclopentylsulfonyl, cyclohexylsulfonyl, cycloheptylsulfonyl, phenylsulfonyl, tolylsulfonyl, pyridylsulfonyl, benzoyl, 2-, 3- or 4-methylbenzoyl, 2-, 3- or 4-methoxybenzoyl, thien-2-ylcarbonyl or thien-3-ylcarbonyl.

Preferred $Z^1$ is for example methylsulfonylamino, ethylsulfonylamino, propylsulfonylamino, isopropylsulfonylamino, butylsulfonylamino, mono- or dimethylaminosulfonylamino, mono- or diethyl aminosulfonylamino, mono- or dipropylamino sulfonylamino, mono- or diisopropylaminosulfonylamino, mono- or dibutylaminosulfonylamino or (N-methyl-N-ethylaminosulfonyl)amino.

$Z^6$ further includes for example fluor, chlor, brom, benzyl, 2-methylbenzyl, 2,4-dimethylbenzyl, 2-methoxybenzyl, 2,4-dimethoxybenzyl, methylamino, ethylamino, propylamino, isopropylamino, butylamino, pentylamino, hexylamino, heptylamino, octylamino, 2-ethylhexylamino, methylthio, ethylthio, propylthio, isopropylthio or butylthio.

Preferred $Z^3$ and $Z^4$ further include for example allyl and methallyl.

Examples of preferred $R^2$ are methoxycarbonyl, ethoxycarbonyl, propoxycarbonyl, isopropoxycarbonyl, butoxycarbonyl, pentyloxycarbonyl, hexyloxycarbonyl, formyl, acetyl, propionyl, butyryl and isobutyryl.

$E^1$ and $E^2$ or $Z^3$ and $Z^4$ combined with the adjacent nitrogen atom in either case into a 5- or 6-membered saturated heterocyclic radical with or without further hetero atoms selected from the group consisting of oxygen, nitrogen and sulfur can be for example pyrrolidinyl, piperidinyl, morpholinyl, piperazinyl or N-($C_1$–$C_4$-alkyl)piperazinyl.

In a preferred embodiment, X is CH.

In a further preferred embodiment, $R^2$ is cyano.

In a further preferred embodiment, $R^3$ is $C_1$–$C_{13}$-alkyl, uninterrupted or interrupted by 1, 2 or 3 oxygen atoms, especially $C_1$–$C_6$-alkyl, uninterrupted or interrupted by 1 or 2 oxygen atoms.

In a particularly preferred embodiment, the dyes of this invention are methine dyes of the formula I where
$R^1$ is a radical of the formula IIa;
X is CH,
$R^2$ is cyano,
$R^3$ is $C_1$–$C_{13}$-alkyl, uninterrupted or interrupted by 1, 2 or 3 oxygen atoms, especially $C_1$–$C_6$-alkyl, uninterrupted or interrupted by 1 or 2 oxygen atoms.

Particular preference is given to methine dyes of the formula I as set forth in Table I.1.

TABLE I.1

Particularly preferred compounds of the formula I

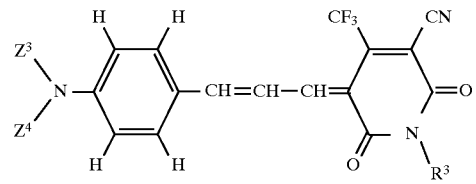

| No. | $Z^3$ | $Z^4$ | $R^3$ |
|---|---|---|---|
| I.1.1 | methyl | methyl | methyl |
| I.1.2 | methyl | methyl | ethyl |
| I.1.3 | methyl | methyl | n-butyl |
| I.1.4 | methyl | methyl | n-hexyl |
| I.1.5 | ethyl | ethyl | methyl |
| I.1.6 | ethyl | ethyl | ethyl |
| I.1.7 | ethyl | ethyl | n-butyl |
| I.1.8 | ethyl | ethyl | n-hexyl |

In a further particularly preferred embodiment, the dyes of this invention are methine dyes of the formula I where
$R^1$ is a radical of the formula IIg, IIh or in particular IIi,
X is CH,
$R^2$ is cyano,
$R^3$ is $C_1$–$C_{13}$-alkyl, uninterrupted or interrupted by 1, 2 or 3 oxygen atoms, especially $C_1$–$C_6$-alkyl, uninterrupted or interrupted by 1 or 2 oxygen atoms,
$Z^3$ and $Z^4$ are identical or different and are each hydrogen, alkyl, unsubstituted or substituted as mentioned above and uninterrupted or interrupted by 1, 2 or 3 oxygen atoms, alkenyl, cycloalkyl, unsubstituted or substituted by 1, 2, 3, 4 or 5 alkyl substituents which in turn are substituted or unsubstituted, or aryl, preferably naphthyl or especially phenyl, unsubstituted or substituted as mentioned above, and $Z^6$ is hydrogen, alkyl, phenyl, unsubstituted or substituted by 1, 2 or 3 alkyl radicals, or cycloalkyl, unsubstituted or substituted by 1, 2, 3, 4 or 5 alkyl substituents, which in turn are substituted or unsubstituted.

In a further specific embodiment, the dyes of this invention are methine dyes of the formula I as set forth in Table I.2.

TABLE I.2

Particularly preferred compounds of the formula I

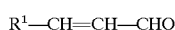

| No. | $NZ^3Z^4$ | $Z^6$ | $R^3$ |
|---|---|---|---|
| I.2.1 | $(C_4H_9)_2N$ | $CH_2C(CH_3)_3$ | $CH_3$ |
| I.2.2 | $(C_4H_9)_2N$ | $CH_2C(CH_3)_3$ | $C_2H_5$ |
| I.2.3 | $(C_2H_9)_2N$ | $CH_2C(CH_3)_3$ | $CH_3$ |
| I.2.4 | $(C_2H_5)_2N$ | $CH_2C(CH_3)_3$ | $CH_3$ |
| I.2.5 | $(C_4H_9)_2N$ | $C_6H_5$ | $C_4H_9$ |
| I.2.6 | $CH_3OC_2H_4OC_3H_6$\N/$C_2H_5$ | $C_6H_5$ | $CH_3$ |
| I.2.7 | (2-methylphenyl)-N-$C_2H_5$ | $C(CH_3)_3$ | $CH_3$ |
| I.2.8 | $(C_4H_9)_2N$ | $C_6H_{11}$ | $CH_3$ |
| I.2.9 | $(C_4H_9)_2N$ | $C_6H_5$ | $CH_3$ |
| I.2.10 | $(C_4H_9)_2N$ | $C_6H_5$ | $C_6H_{13}$ |
| I.2.11 | $(C_4H_9)_2N$ | $C_6H_5$ | $C_2H_5$ |
| I.2.12 | $(C_4H_9)_2N$ | 3-methylphenyl | $CH_3$ |
| I.2.13 | $(C_4H_9)_2N$ | $C(CH_3)_3$ | $CH_3$ |
| I.2.14 | $(C_4H_9)_2N$ | $CH(C_2H_5)C_4H_9$ | $CH_3$ |
| I.2.15 | $(C_4H_9)_2N$ | $CH(CH_3)_2$ | $CH_3$ |
| I.2.16 | $CH_3OC_2H_4OC_3H_6$\N/$C_2H_5$ | $C(CH_3)_3$ | $CH_3$ |
| I.2.17 | $(C_4H_9)_2N$ | $C_6H_5$ | $COCH_3$ |

The methine and azamethine dyes of the formula I of this invention can be prepared by methods known to those skilled in the art.

For instance, the dyes of the formula I where X is CH can be obtained by condensation of aldehydes of the formula III $$R^1—CH=CH—CHO \qquad (III)$$

with trifluoromethylpyridones of the formula IV

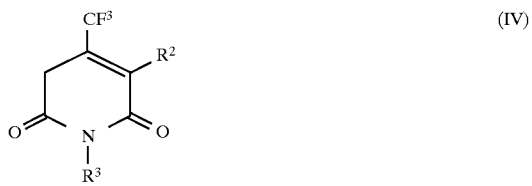

Those dyes of the formula I where X is nitrogen can be obtained for example by oxidative coupling of imines of the formula V

which are present in a tautomeric equilibrium with the corresponding enamine, with the trifluoromethylpyridones IV.

The present invention further provides a process for transferring dyes from a transfer to a polymer-coated paper, preferably by diffusion or sublimation with the aid of an energy source, which comprises using a transfer comprising one or more methine or azamethine dyes of the formula I.

To make the transfers required for the process of the present invention, the dyes of the formula I are incorporated in a suitable organic solvent or in mixtures of solvents with one or more binders, optionally in the presence of assistants, to form a printing ink. This printing ink preferably contains the dyes for example in a molecularly disperse, ie. dissolved, form. The printing ink can be applied to the inert support for example by means of a doctor blade and air dried for example or using a blow dryer. Suitable organic solvents for the dyes of the formula I are for example those in which the solubility of the dyes of the formula I at 20° C. is greater than 1% by weight, preferably greater than 5% by weight. Examples are ethanol, propanol, isobutanol, tetrahydrofuran, methylene chloride, methyl ethyl ketone, cyclopentanone, cyclohexanone, toluene, chlorobenzene or mixtures thereof.

Suitable binders include all resins or polymer materials which are soluble in organic solvents and which are capable of binding the dyes to the inert support sufficiently firmly to prevent rubbing off. Preference is given to those binders which, after the air drying of the printing ink, include the dyes in the form of a clear, transparent film without any visible sign of crystallization of the dyes.

Such binders are mentioned for example in U.S. Pat. No. 5,132,438 or the pertinent patent applications cited therein. Also suitable are saturated linear polyesters.

Preferred binders include ethylcellulose, ethylhydroxyethylcellulose, polyvinyl butyral, polyvinyl acetate, cellulose propionate and saturated linear polyesters.

The weight ratio of binder:dye generally ranges from 1:1 to 10:1.

Suitable assistants include for example release agents as mentioned in U.S. Pat. No. 5,132,438 or the pertinent patent applications cited therein. Also suitable are organic additives which prevent the crystallizing out of the transfer dyes in the course of storage or on heating the ink ribbon, for example cholesterol or vanillin.

Suitable inert supports are described for example in U.S. Pat. No. 5,132,438 or the pertinent patent applications cited therein. The thickness of the support generally ranges from 3 to 30 μm.

Suitable dye receiver layers include in general all thermally stable plastics layers with affinity for the dyes to be transferred, for example modified polycarbonates or polyesters. Further details can be found for example in U.S. Pat. No. 5,132,438 or the pertinent patent applications cited therein.

The transfer itself is effected by means of an energy source, for example by means of a laser or a thermal head, for which the latter has to be heatable to a temperature of ≧300° C. in order that the dye transfer may take place within the time range 0<t<15 msec. In the course of the transfer, the dye migrates out of the transfer sheet and diffuses into the surface coating of the receiving medium.

The novel dyes of the formula I are notable for advantageous application properties. They exhibit high solubility in the ink ribbon (good compatibility with the binder), a high stability in the printing ink, good transferability, good image stability (ie. good lightfastness and also good stability to environmental effects, for example moisture, temperature or chemicals), and permit flexible coloristic adaptation to given subtractive primary colors as part of an optimal trichromat (highest possible brilliance of primary or secondary colors and deep neutral black).

It was also found that synthetic materials can be advantageously dyed or printed by treating them with one or more of the dyes of this invention. Synthetic materials include for example polyesters, polyamides or polycarbonates. Particularly suitable materials are in textile form, such as fibers, yarns, threads, knits, wovens or nonwovens composed of polyester, modified polyester, e.g. anionically modified polyester, blends of polyester with cellulose, cotton, viscose or wool, or polyamide. The dyeing and printing conditions are known to those skilled in the art. The dyeings or prints obtained have high lightfastness, high brilliance and very good wetfastness properties, for example very good wash or perspiration fastness.

The dyes of this invention can also be used for dyeing keratinous fibers, for example in hair dyeing or in dyeing furs.

The novel dyes of the formula I are also advantageously suitable for producing color filters as described for example in EP-A-399 473.

Finally, they can also be used with advantage as colorants for the preparation of toners for electrophotography.

The Examples which follow illustrate the invention.

A) Preparation

EXAMPLE 1

11.8 g (0.1 mol) of p-N,N-diethylaminocinnamaldehyde and 28.8 g (0.1 mol) of 3-cyano-1-n-hexyl-6-hydroxy-4-trifluoromethyl-1-H-pyridin-2-one are suspended in 50 ml of acetic anhydride at room temperature and then heated at 80° C. for one hour. After cooling down to room temperature, the resulting precipitate is filtered off with suction, washed with 10 ml of ice-cold methanol and dried at 50° C. under reduced pressure to leave 30.5 g (75% of theory) of a blue compound of the formula

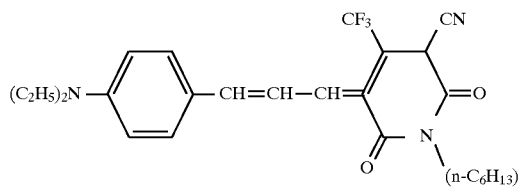

The same method affords the dyes listed in Table 1.

TABLE 1

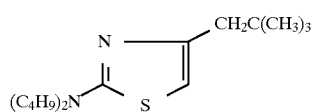

| Ex No. | $Z^3$ | $Z^4$ | $R^3$ | λmax [nm] (in CHCl$_2$) |
|---|---|---|---|---|
| 2 | methyl | methyl | methyl | 654 |
| 3 | methyl | methyl | ethyl | 654 |
| 4 | methyl | methyl | n-butyl | 652 |
| 5 | methyl | methyl | n-hexyl | 654 |
| 6 | ethyl | ethyl | methyl | 658 |
| 7 | ethyl | ethyl | ethyl | 660 |
| 8 | ethyl | ethyl | n-butyl | 660 |

EXAMPLE 9 a) To 128 g of potassium thiocyanate in 150 ml of acetone are added 185 ml of 3,3-dimethylbutyryl chloride at from 20° to 25° C. The mixture is stirred at room temperature for 8 hours, at which point 234 ml of dibutylamine are added dropwise. After 4 hours, 120 g of ice and 142 ml of 50% strength by weight sodium hydroxide solution are added while the temperature is held at not more than 40° C. A solution of 132 g of chloroacetic acid in 120 ml of water is added, and the batch is heated to 80° C. for 8 h. A phase separation is then carried out at 60° C. The organic phase is diluted with methylene chloride and repeatedly extracted with dilute hydrochloric acid and then with water. After drying over sodium sulfate, the solvent is distilled off in a rotary evaporator to leave 311 g of a dark oil comprising 69.5% (GC) of the compound of the formula b) To a solution, prepared at from 0° to 5° C., of 38.5 g of N,N-dimethylaminoacrolein and 60 g of phosphorus oxychloride in 100 ml of dichloromethane was added with ice-cooling a solution of 105 g of 2-dibutylamino-4-(2,2-dimethyl-propyl)thiazole (stage a) in 100 ml of dichloromethane by dropwise addition. After two hours' stirring at 20° C., the solution is poured onto ice-water, the mixture is stirred overnight, the phases are separated and then the aqueous phase is extracted with ethyl acetate. The combined organic phases are dried over sodium sulfate and the solvent is then distilled off in a rotary evaporator to leave 95 g of the compound of the formula

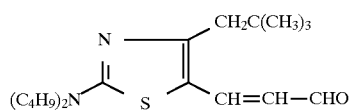

A synthetic alternative to preparing analogous α,β-unsaturated aldehydes is the aldol condensation of thiazole aldehydes of the formula

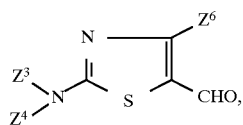

which can likewise be obtained from the thiazoles of stage a) by Vilsmeyer synthesis, using acetaldehyde as methylene component, by methods which are known to those skilled in the art.

c) 6.54 g of 3-cyano-6-hydroxy-1-methyl-4-trifluoromethyl-1-H-pyridin-2-one and 9.72 g of 2-dibutylamino-4-(2,2-dimethyl-propyl)-5-acroleylthiazole (stage b) are suspended in 25 ml of acetic anhydride at room temperature and then heated to 80° C. for 1 h. The precipitate which forms on cooling down is filtered off with suction, washed with water and methanol and recrystallized from ethyl acetate to leave 13 g of a blue crystalline compound of the formula The same method is used to obtain the dyes listed below in Table 2.

TABLE 2

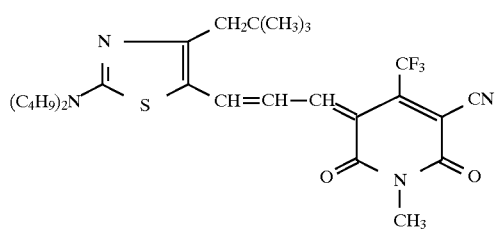

| Ex. No. | $NZ^3Z^4$ | $Z^6$ | $R^3$ |
|---|---|---|---|
| 10 | $(C_4H_9)_2N$ | $CH_2C(CH_3)_3$ | $C_2H_5$ |
| 11 | $(C_2H_9)_2N$ | $CH_2C(CH_3)_3$ | $CH_3$ |
| 12 | $(C_2H_5)_2N$ | $CH_2C(CH_3)_3$ | $CH_3$ |
| 13 | $(C_4H_9)_2N$ | $C_6H_5$ | $C_4H_9$ |
| 14 | $CH_3OC_2H_4OC_3H_6\text{-}N(C_2H_5)\text{-}$ | $C_6H_5$ | $CH_3$ |
| 15 | 2-CH$_3$-6-(N-C$_2$H$_5$)-C$_6$H$_3$- | $C(CH_3)_3$ | $CH_3$ |
| 16 | $(C_4H_9)_2N$ | $C_6H_{11}$ | $CH_3$ |
| 17 | $(C_4H_9)_2N$ | $C_6H_5$ | $CH_3$ |
| 18 | $(C_4H_9)_2N$ | $C_6H_5$ | $C_6H_{13}$ |
| 19 | $(C_4H_9)_2N$ | $C_6H_5$ | $C_2H_5$ |

TABLE 2-continued

| Ex. No. | $NZ^3Z^4$ | $Z^6$ | $R^3$ |
|---|---|---|---|
| 20 | $(C_4H_9)_2N$ | 2,3-dimethylphenyl | $CH_3$ |
| 21 | $(C_4H_9)_2N$ | $C(CH_3)_3$ | $CH_3$ |
| 22 | $(C_4H_9)_2N$ | $CH(C_2H_5)C_4H_9$ | $CH_3$ |
| 23 | $(C_4H_9)_2N$ | $CH(CH_3)_2$ | $CH_3$ |
| 24 | $CH_3OC_2H_4OC_3H_6\text{-}N(C_2H_5)\text{-}$ | $C(CH_3)_3$ | $CH_3$ |
| 25 | $(C_4H_9)_2N$ | $C_6H_5$ | $COCH_3$ |

B) Dying method

Polyester fabric is introduced at 55° C. into a dyebath comprising from 0.2 to 1.0% by weight (according to Table 3) of dye (based on weight of fabric), 1 g/l of the sodium salt of a condensation product of naphthalene-2-sulfonic acid and formaldehyde and 0.5 ml/l of buffer solution (pH 4.5). The bath is then heated to 130° C. over 30 min and held at that temperature for a further 60 min.

After cooling and rinsing, the fabric is reduction cleared in a bath comprising 4 g/l of 32% strength by weight sodium dithionite and 1 g/l of an addition product of 12 mol of ethylene oxide with 1 mol of oleylamine at 70° C. for 30 min and then rinsed and dried.

The dyes of Examples 1 to 8 gave very lightfast brilliant blue dyeings having very good wetfastness properties, for example very good wash and perspiration fastness.

TABLE 3

| Ex. No. | Percentage of dye x [%] |
|---|---|
| 1 | 0.25 |
| 2 | 0.60 |
| 3 | 0.50 |
| 4 | 0.275 |
| 5 | 0.40 |
| 6 | 0.425 |
| 7 | 0.30 |
| 8 | 0.30 |

We claim:
1. A methine or azamethine dye of the formula I

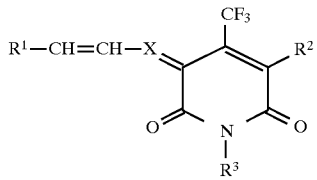 (I)

where

X is nitrogen or CH, $R^2$ is cyano, carbamoyl, carboxyl, alkoxycarbonyl or alkanoyl, and $R^3$ is alkyl, unsubstituted or substituted by one, two or three of the following groups: alkanoyloxy, alkylaminocarbonyloxy, alkoxycarbonyl, alkoxycarbonyloxy, the alkyl group in the three last mentioned radicals being uninterrupted or interrupted by 1, 2 or 3 oxygen atoms and unsubstituted or phenyl- or phenoxy-substituted, cycloalkyl, unsubstituted or bearing 1, 2, 3, 4 or 5 alkyl groups, aryl, unsubstituted or bearing one, two or three substituents selected from the group consisting of alkyl, alkoxy, halogen, nitro and carboxyl, cyclo-alkyloxy, phenoxy, halogen, alkoxy, hydroxyl or cyano and/or uninterrupted or interrupted by 1, 2 or 3 oxygen atoms, cycloalkyl, unsubstituted or substituted by 1, 2, 3, 4 or 5 alkyl substituents, aryl, unsubstituted or bearing one, two or three substituents selected from the group consisting of alkyl, alkoxy, halogen, nitro and carboxyl, or a radical of the formula $NE^1E^2$, where $E^1$ and $E^2$ are identical or different and each have the meanings specified for $R^3$ other than $NE^1E^2$ or are pyridyl, unsubstituted or bearing one, two or three substituents selected from the group consisting of alkyl, alkoxy, halogen, nitro and carboxyl, alkanoyl, alkoxycarbonyl, alkylsulfonyl, cycloalkylsulfonyl, phenysulfonyl, substituted or unsubstituted, pyridylsufonyl, substituted or unsubstituted, benzoyl, substituted or unsubstituted, pyridylcarbonyl or thienylcarbonyl, or $E^1$ and $E^2$ plus the nitrogen to which they are attached are succinimido, unsubstituted or bearing one or two alkyl substituents, phthalimido, unsubstituted or bearing one or two $C_1$–$C_4$-alkyl substituents, or a 5- or 6-membered saturated heterocyclic radical with or without one or more alkyl substituents and/or 1 or 2 further hetero atoms selected from the group consisting of oxygen, nitrogen and sulfur, $R^1$ is a radical of the formula

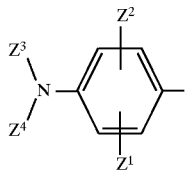 (IIa)

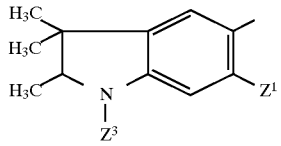 (IIb)

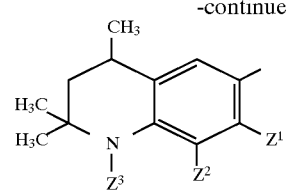 (IIc)

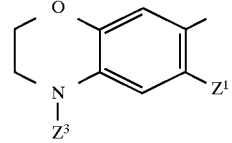 (IId)

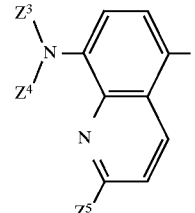 (IIe)

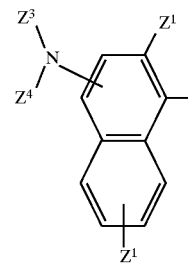 (IIf)

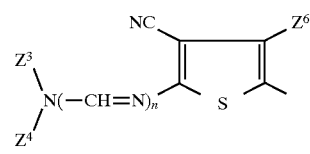 (IIg)

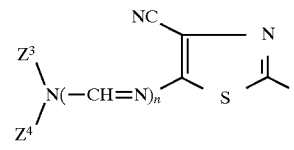 (IIh)

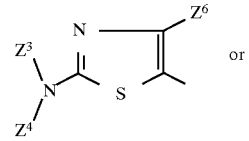 (IIi)

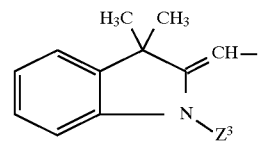 (IIj)

where n is 0 or 1, $Z^1$ is hydrogen, alkyl, uninterrupted or interrupted by 1, 2 or 3 oxygen-atoms, hydroxyl, alkoxy, alkylsulfonylamino, mono- or dialkylaminosulfonylamino or —NHCOZ$^7$ or —NHCO$_2$Z$^7$, where Z$^7$ is phenyl, benzyl, tolyl or alkyl, uninterrupted or interrupted by 1, 2 or 3 oxygen atoms, and $Z^2$ is hydrogen, alkyl or alkoxy;

$Z^3$ and $Z^4$ are identical or different and each have the meanings specified for $E^1$ and $E^2$ or are alkenyl, or $Z^3$ and $Z^4$ plus the nitrogen atom to which they are attached are a 5- or 6-membered saturated heterocyclic radical with or without one or two further hetero atoms selected from the group consisting of oxygen, nitrogen and sulfur, $Z^5$ is hydrogen or alkyl;

$Z^6$ is hydrogen, halogen, alkyl, phenyl, phenylalkyl, cycloalkyl, thienyl, hydroxyl, alkoxy, alkylthio or monoalkylamino, the two phenyl radicals being unsubstituted or bearing one, two or three substituents selected from the group consisting of alkyl, alkoxy, halogen, nitro and carboxyl;

and the salts thereof.

2. The methine dye as claimed in claim 1, wherein, in the formula I, X is CH.

3. The methine or azamethine dye as claimed in claim 1, wherein, in the formula I, $R^2$ is cyano.

4. The methine or azamethine dye as claimed in claim 1, wherein $R^3$ is alkyl, unsubstituted or substituted by cycloalkyl, aryl, alkoxy, halogen, nitro or carboxyl and/or uninterrupted or interrupted by 1, 2 or 3 oxygen atoms, or is $NE^1E^2$.

5. The methine dye as claimed in claim 1, wherein $R^1$ is a radical of the formula IIa.

6. The methine dye as claimed in claim 5, wherein, in the formula IIa, $Z^1$ and $Z^2$ are independently of each other hydrogen, alkyl, uninterrupted or interrupted by 1, 2 or 3 oxygen atoms, or alkoxy;

$Z^3$ and $Z^4$ are independently of each other hydrogen, alkyl, unsubstituted or substituted by cycloalkyl, aryl, halogen, nitro, or carboxyl and uninterrupted or interrupted by 1, 2 or 3 oxygen atoms, or cycloalkyl, unsubstituted or substituted by 1, 2 or 3 alkyl substituents, $R^3$ is alkyl with or without interruption by 1, 2 or 3 oxygen atoms.

7. The methine dye as claimed in claim 2, comprising a compound of the formula I conforming to the following table:

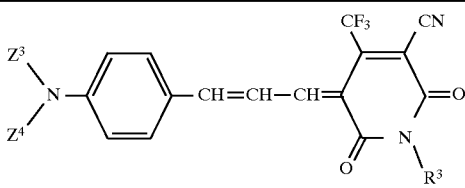

| $Z^3$ | $Z^4$ | $R^3$ |
|-------|-------|-------|
| methyl | methyl | methyl |
| methyl | methyl | ethyl |
| methyl | methyl | n-butyl |
| methyl | methyl | n-hexyl |
| ethyl | ethyl | methyl |
| ethyl | ethyl | ethyl |
| ehyl | ethyl | n-butyl |
| ethyl | ethyl | n-hexyl |

8. A process for transferring dyes from a transfer to a polymer-coated paper, which comprises using a transfer comprising one or more methine or azamethine dyes as claimed in claim 1.

9. A process for dyeing or printing synthetic materials, which comprises treating the synthetic materials with one or more methine or azamethine dyes as claimed in claim 1.

10. A colorant comprising at least one methine or azamethine dye as claimed in claim 1.

11. A process for preparing the compounds of claim 1, which comprises reacting an aldehyde of the formula II

$$R^1-CH=CH-CHO \qquad (III)$$

with a trifluoromethylpyridone of the formula IV

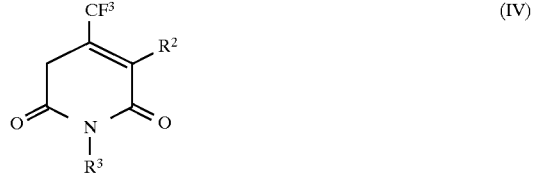 (IV)

to prepare compounds of the formula I where X is CH, or reacting a compound of the formula V $$R^1-CH_2-CH=NH \qquad (V)$$

with a trifluoromethylpyridone of the formula IV, where $R^1$, $R^2$ and $R^3$ are each as defined in claim 1, to prepare the compounds of the formula I where X is nitrogen.

* * * * *

UNITED STATES PATENT AND TRADEMARK OFFICE
CERTIFICATE OF CORRECTION

PATENT NO. : 5,892,046

DATED : April 6, 1999

INVENTOR(S): Clemens GRUND, et al

It is certified that an error appears in the above-identified patent and that said Letters Patent is hereby corrected as shown below:

Column 4, line 42, "—NHOCOZ$^7$ or —NHC$_2$Z$^7$"
should read -- —NHOCOZ$^7$ or —NHOC$_2$Z$^7$--;
line 50, "Z$_4$" should read --Z$^4$--.

Column 5, line 18, "methoxy, ethoxy, ethoxy, propoxy," should read --methoxy, ethoxy, propoxy,--.

Column 7, Table 1.2, No. 1.2.3, "(C$_2$H$_9$)$_2$N" should read --(C$_4$H$_9$)$_2$N--.

Column 9, line 68, insert as new line, --$\lambda_{max}$(in CH$_2$Cl$_2$): 660 nm--.

Column 11, Table 2, No. 11, "(C$_2$H$_9$)$_2$N" should read --(C$_4$H$_9$)$_2$N--.

Column 16, line 29, "formula II" should read --formula III--.

Signed and Sealed this

Twenty-ninth Day of May, 2001

Attest:

NICHOLAS P. GODICI

Attesting Officer

Acting Director of the United States Patent and Trademark Office